(12) United States Patent
Zhu et al.

(10) Patent No.: US 11,342,762 B2
(45) Date of Patent: May 24, 2022

(54) BATTERY CHARGING CUT-OFF CIRCUIT

(71) Applicant: Cisco Technology, Inc., San Jose, CA (US)

(72) Inventors: Xiqun Zhu, Cupertino, CA (US); Sung Kee Baek, San Ramon, CA (US); Wingo Cheong, Fremont, CA (US); Steven Anthony Granzella, Saratoga, CA (US); Joel Goergen, Soulsbyville, CA (US); Charles Calvin Byers, Wheaton, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/097,611

(22) Filed: Nov. 13, 2020

(65) Prior Publication Data

US 2021/0066936 A1  Mar. 4, 2021

Related U.S. Application Data

(62) Division of application No. 15/871,999, filed on Jan. 16, 2018, now Pat. No. 10,868,431.

(51) Int. Cl.
*H02J 7/00* (2006.01)

(52) U.S. Cl.
CPC .......... *H02J 7/0021* (2013.01); *H02J 7/0047* (2013.01)

(58) Field of Classification Search
CPC .... H02J 7/0021; H02J 7/0047; H02J 7/00309; H02J 7/00306; H02J 7/0031; H02J 9/061
See application file for complete search history.

(56) References Cited

U.S. PATENT DOCUMENTS

| | | | |
|---|---|---|---|
| 3,772,473 A | 11/1973 | Parham | |
| 4,812,672 A | 3/1989 | Cowan et al. | |
| 4,851,756 A | 7/1989 | Schaller et al. | |
| 5,089,762 A * | 2/1992 | Sloan | H02J 1/14 320/127 |
| 5,179,337 A | 1/1993 | Staarman et al. | |
| 5,477,124 A | 12/1995 | Mikitaka | |
| 5,539,298 A | 7/1996 | Perkins et al. | |
| 6,075,345 A | 6/2000 | Lee | |
| 6,311,279 B1 | 10/2001 | Nguyen | |
| 6,329,796 B1 * | 12/2001 | Popescu | H02J 7/0031 320/134 |

(Continued)

OTHER PUBLICATIONS

Cisco 1240 Connected Grid Router; Hardware Installation Guide; Last Updated: Aug. 25, 2017; First Published Mar. 24, 2012.

*Primary Examiner* — Pinping Sun

(57) ABSTRACT

In one embodiment, a battery backup unit (BBU) cut-off and recharge circuit includes: a first transistor, a power entry connection connected to a main power supply, where power from the power entry connection flows to application circuits for an electronic device, and the first transistor is positioned between a BBU and the power entry connection, and a microcontroller, where the microcontroller is operative to: detect a loss of power from the main power supply, turn on the first transistor to enable the BBU to discharge through the power entry connection to application circuits, detect a status of charge (SOC) for the BBU, and upon detecting that the SOC is under a predefined threshold, set the BBU cut-off and recharge circuit to a lockdown state by turning off the first transistor.

20 Claims, 2 Drawing Sheets

(56) References Cited

U.S. PATENT DOCUMENTS

| | | | |
|---|---|---|---|
| 6,507,173 B1 | 1/2003 | Spiridon et al. | |
| 6,548,986 B1 | 4/2003 | Jakubowski | |
| 6,605,879 B2 | 8/2003 | Wade et al. | |
| 6,771,047 B1 | 8/2004 | Ogonowsky | |
| 7,321,976 B2 | 1/2008 | Hasegawa | |
| 8,541,983 B2 | 9/2013 | Veselic et al. | |
| 8,569,913 B2 | 10/2013 | Kumar et al. | |
| 8,703,329 B2 | 4/2014 | Barbarich et al. | |
| 9,026,812 B2 | 5/2015 | Ravindranath et al. | |
| 9,098,278 B1 * | 8/2015 | Nay | G06F 1/3296 |
| 9,184,608 B2 | 11/2015 | Esnard et al. | |
| 9,644,593 B2 | 5/2017 | Pereira et al. | |
| 10,059,172 B2 * | 8/2018 | Liu | F25B 27/00 |
| 2003/0075993 A1 | 4/2003 | Fadell et al. | |
| 2006/0139010 A1 | 6/2006 | Wang et al. | |
| 2006/0271315 A1 * | 11/2006 | Cargonja | G01R 19/16552 |
| | | | 702/63 |
| 2007/0210650 A1 | 9/2007 | Togashi | |
| 2008/0106225 A1 | 5/2008 | Mueller et al. | |
| 2008/0147260 A1 * | 6/2008 | Moran | B60L 58/12 |
| | | | 701/22 |
| 2012/0248876 A1 * | 10/2012 | Tamura | G01R 31/392 |
| | | | 307/66 |
| 2014/0358367 A1 | 12/2014 | Copeland et al. | |
| 2015/0114941 A1 | 4/2015 | Denis et al. | |
| 2015/0180040 A1 * | 6/2015 | Sano | H01M 4/73 |
| | | | 429/241 |
| 2015/0357908 A1 | 12/2015 | Ekbote | |
| 2015/0377971 A1 | 12/2015 | Keating et al. | |
| 2016/0139208 A1 * | 5/2016 | Tsuruta | G01R 31/371 |
| | | | 324/426 |
| 2016/0152154 A1 | 6/2016 | Mizuno et al. | |
| 2017/0033575 A1 | 2/2017 | Kaji et al. | |
| 2017/0106764 A1 | 4/2017 | Beaston et al. | |

* cited by examiner

BATTERY CHARGING CUT-OFF CIRCUIT

CROSS REFERENCE TO RELATED APPLICATION

This application is a divisional of U.S. application Ser. No. 15/871,999, filed Jan. 16, 2018, the entirety of which is incorporated herein by reference.

TECHNICAL FIELD

The present disclosure generally relates to the prevention of excess drainage from a rechargeable battery.

BACKGROUND

Internet of Things (IoT) devices such as, for example, data sensors, wireless routers/gateways, and switches, are typically deployed with rechargeable battery backup packs. Rechargeable battery backup packs are operative to use one or more rechargeable batteries to provide backup power when power is not provided by a main power source. In normal operation, the rechargeable batteries in a backup pack are charged by main AC (alternating current) or DC (direct current) power. If, for whatever reason, the main power source is interrupted, a device's system will switch to the backup pack to power the device until the main power recovers or until battery power is depleted.

Among currently available rechargeable battery technologies, due to its size, weight, capacity, price, supply/sourcing and other factors, Lithium-Ion (Li-Ion) is most commonly used in backup packs. However, due to their chemical characteristics, Li-Ion batteries should not be discharged below a predetermined voltage. There are safety concerns regarding subsequent recharging of Li-Ion batteries if the battery had previously been discharged to a voltage below the predetermined voltage level. In such a case, the recharged battery may overheat, catch fire, or even explode. For this reason, most devices and systems with rechargeable battery backup packs have low battery shut-down functions which enter a "shutdown mode", i.e., shut down the battery backup pack when battery Status-Of-Charge (SOC) is lower than a preset system-dependent threshold level.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Overview

Figure 1:
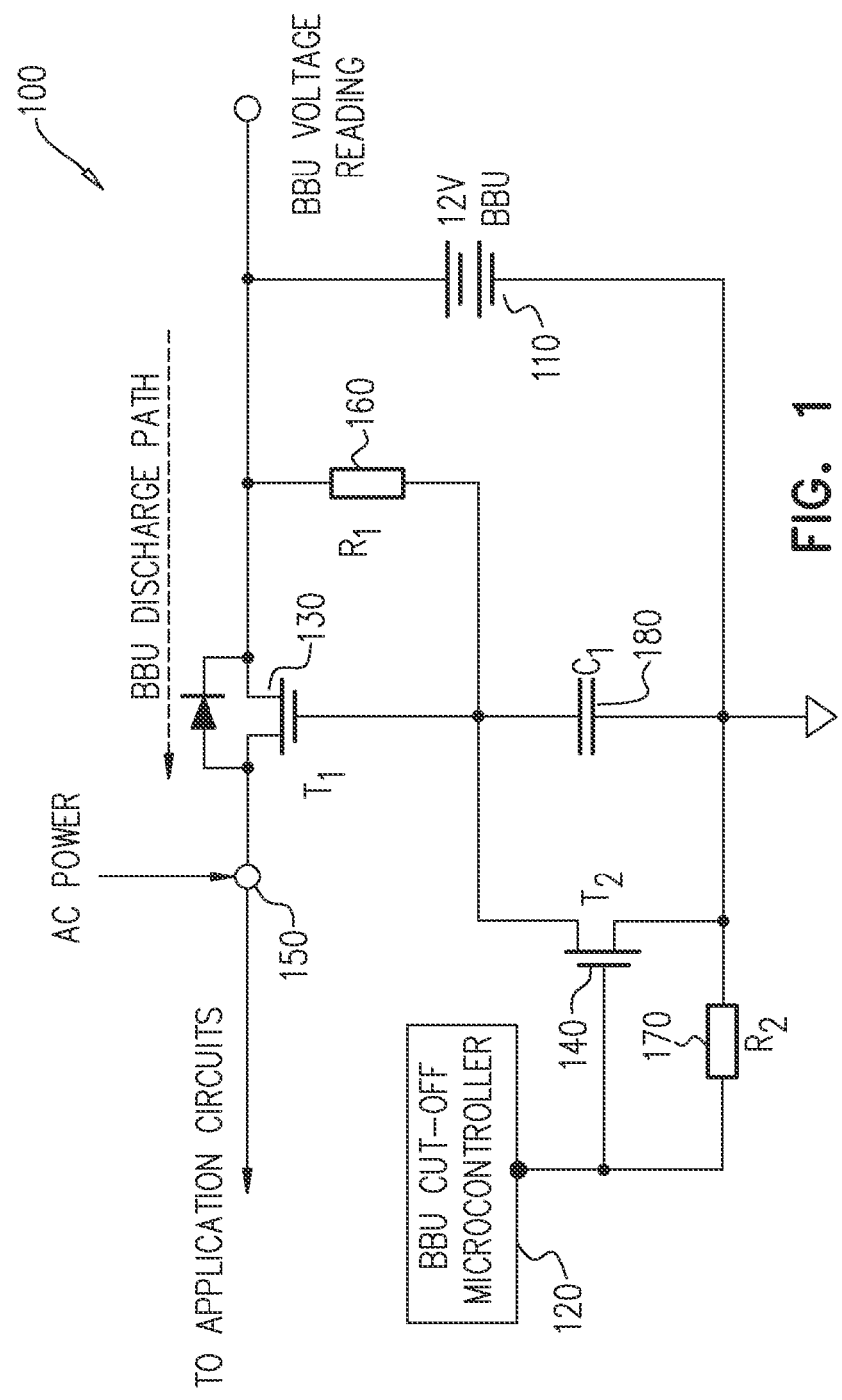
FIG. 1 is a schematic illustration of an exemplary battery backup unit (BBU) cut-off and recharge circuit, constructed and operative in accordance with embodiments described herein.

A battery backup unit (BBU) cut-off and recharge circuit includes: a first transistor, a power entry connection connected to a main power supply, where power from the power entry connection flows to application circuits for an electronic device, and the first transistor is positioned between a BBU and the power entry connection, and a microcontroller, where the microcontroller is operative to: detect a loss of power from the main power supply, turn on the first transistor to enable the BBU to discharge through the power entry connection to application circuits, detect a status of charge (SOC) for the BBU, and upon detecting that the SOC is under a predefined threshold, set the BBU cut-off and recharge circuit to a lockdown state by turning off the first transistor.

Detailed Description of Example Embodiments

It will be appreciated by one of ordinary skill in the art that entering a shutdown mode may not prevent the battery from continuing to discharge. For example, in shutdown mode, the battery may still be physically connected to the device/system to which it is configured to provide backup power. Very small amounts of current may therefore still flow through the battery which may continue to drain, albeit at a lower rate through a physical connection to the device/system. Shutting down the battery may therefore not necessarily prevent it from eventually discharging to a level at which recharging may be unsafe. Accordingly, if the battery remains in shutdown mode for an extended period of time, it may be still be necessary to replace, or at least disable, the battery when the main power is restored and the device/system returns to normal operations.

Furthermore, as a preventive measure designed to avoid permanent damage to the battery (which may be caused by leakage over time in shutdown mode), systems are often designed with an arbitrarily high charge level for triggering self shutdown. This preventive measure serves to effectively reduce the usable capacity of rechargeable batteries in the IoT systems.

Some commercially available battery backup units (BBUs) address these issues by adding lockout functionality in an attempt to reduce exposure to an excessively drained battery. For example, the battery power management circuit for a Cisco 1240 Connected Grid Router (also known as a "CGR1240") is configured with lockdown functionality in addition to the shutdown functionality as described hereinabove. If main power is not restored within approximately five weeks after shutdown, the CGR1240 "locks down" the BBU, blocking BBU charging and discharging. The lockdown state prevents the BBU from recharging, and accordingly the BBU must be replaced and its internal battery discarded.

It will be appreciated that replacing BBUs in devices/systems in remote locations (where IoT systems are often deployed) may be very costly, and in fact may incur more expense than the replacement cost for the BBUs themselves.

In accordance with embodiments described herein, a battery backup unit (BBU) cut-off and recharge circuit may be employed to lock down a BBU by electronically cutting off the physical connection between a BBU and its associated device/system after a shutdown function is activated in response to a low battery condition. By cutting off the connection, the battery leakage from the BBU to the device/system may be reduced by multiple orders of magnitude, from a micro ampere range down to a nano-ampere range, or even zero. Once cut off from the device/system, battery drainage may cease other than via the intrinsic battery's internal current leakage (also known as "battery cell self-discharge"). The shutdown state, and by extension, the effective battery life, may therefore be extended from weeks to months, and possibly to over a year range, approaching the battery's typical shelf life when it would have to be replaced in any case.

Reference is now made to FIG. 1, which is a schematic illustration of an exemplary battery backup unit (BBU) cut-off and recharge circuit 100, constructed and operative in accordance with embodiments described herein. Circuit 100 may be implemented as a component of an electronic device (e.g., an IoT device) and comprises BBU 110, BBU cut-off microcontroller 120, first transistor ($T_1$) 130, second transistor ($T_2$) 140, power entry connection 150, first resistor ($R_1$) 160, second resistor ($R_2$) 170, and capacitor ($C_1$) 180. It will be appreciated that in normal operation, current may flow from connection 150 to application circuits associated with the device. It will also be appreciated that the depiction of the power entering at point 150 as "AC" is exemplary. The embodiments described herein may also support direct current (DC) power.

BBU 110 may be implemented as a 12 volt DC battery that is operative to provide 2~3 amperes of power in the event of an interruption of a main power source, e.g., AC power that flows into circuit 100 at connection 150. $T_1$ 130 and $T_2$ 140 may be implemented as P-channel Metal Oxide Semiconductor Field Effect Transistors (MOSFETs) which are characterized by high input gate resistance such that the current flowing through the P-channel between the source and drain is controlled by the gate voltage. For example, $T_1$ 130 may be implemented as a DMG2302U MOSFET which has 100 nano-ampere of leakage current and is commercially available from Diodes Incorporated. In the exemplary embodiment of FIG. 1, the MOSFETs used to implement $T_1$ 130 and $T_2$ 140 may have drain source resistance $R_{DS}$=8 mOhms, such that a power efficiency penalty for the circuit may be expressed as:

$$I2 \cdot R = (3\ A)^2 \times 0.008\Omega = 0.072\ W. \quad \text{(equation 1)}$$

Or alternatively as:

$$0.072\ W/(12\ V \cdot 3\ A) = 0.2\%. \quad \text{(equation 2)}$$

Microcontroller 120 may be operative to monitor a SOC status for BBU 110 while main power is interrupted. Upon detecting a low SOC status, microcontroller 120 may first notify the device's system to enable the system's applications to be shut down in a controlled manner. A wait state, for example, ten milliseconds, may follow such a notification, in order to provide the system with sufficient time for the shutdown. Microcontroller 120 may then turn off $T_2$ 140, e.g. by using a low signal to raise $T_2$ 140 to a high impedance state, such that the gate voltage of $T_1$ 130 may increase through $R_1$ 160·$C_1$ 180 charging over time, eventually turning off $T_1$ 130 completely.

It will be appreciated that microcontroller 120 is powered by BBU 110 during main power interruption. Accordingly, microcontroller 120 will lose power after cut-off of $T_1$ 130. Microcontroller 120 may not be powered back on until the main power is restored, e.g., AC power entering through connection 150. When the main power is restored, the current flows through connection 150 to power up the application circuits while also charging microcontroller 120 through $T_2$ 140. Once microcontroller 120 is powered up and restarts, it may turn on $T_1$ 130 (by turning on $T_2$ 140) to start charging BBU 110 with low series resistance.

It will be appreciated that the depiction of microcontroller 120 as a single integrated component may be exemplary; the embodiments described herein may also support the provision of the functionality of microcontroller 120 as a combination of discrete components. For example, the functionality of microcontroller 120 may be provided by individual components including memory, programmable input/output (I/O) peripherals, and processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

In accordance with embodiments described herein, circuit 100 may be operative to provide an additional safety measure layer of security by imposing a one minute interrupt service subroutine as part of the BBU charging and discharging control process. In this interrupt service subroutine, the battery SOC may be monitored. If per the monitoring, the battery SOC is lower than a preset threshold, BBU 110 may be cut off. In an exemplary implementation of the interrupt service subroutine, a "BBU cut-off reset control" pin may be driven by a general Input/Output (I/O) pin in microcontroller 120. This I/O pin may be set as input and pulled-down by resistor $R_2$ 170 when it is not driving the BBU cut-off reset control pin. Accordingly, if for whatever reason, microcontroller 120 malfunctions and does not come back into service as programmed, $T_2$ 140 may not be turned on. Instead, $C_1$ 180 will eventually be charged up by $R_1$ 160, thereby cutting off $T_1$ 130. Therefore, if the firmware in microcontroller 120 is corrupted or otherwise non-functional, $T_1$ 130 may be turned off and therefore cut off BBU 110. It will be appreciated that in such a situation, where there is an assumption that the firmware is corrupted, it may be preferable to cut off BBU 110 in order to prevent an unregulated discharge of battery power.

It will be appreciated that by default, $T_1$ 130 may be turned off due to $C_1$ 180 being charged up through $R_1$ 160. Accordingly, main power should be present from the start of operations in order for BBU 110 to be charged and available for use during a power interruption. Otherwise, even if BBU 110 is plugged in and available, $T_1$ 130 will not turn on. However, in accordance with some embodiments described herein, a push button (called "start" button) may be implemented across $C_1$ 180 to manually short $C_1$ 180 momentarily to turn on $T_1$ 130. Afterwards, once the main power is available, the incoming current, e.g., from connection 150, may power the device.

Accordingly, in operation, the system may boot with either the main power on, or a push of the start button. The functionality described herein may be implemented as a part of the device/system's initialization process before a main program (i.e., the program providing the functionality for which the device is configured). The initialization process may set up a timer (e.g., for one minute) and main power loss interrupt (e.g., an I/O input level change interrupt) before proceeding to the main system functions.

The interrupt service subroutine may start periodically according to the timer, e.g., once every minute. The subroutine's main function may be to check the SOC for BBU 110, and based on the SOC, determine whether or not BBU 110 has enough power to continue powering the system. If not, it may send a signal to the system to shut down operations in a controlled manner. Otherwise, if either main power is on, and/or if BBU 110 has sufficient charge (e.g., at least 6%), the interrupt service subroutine may return to the main program.

It will be appreciated that the time set for the timer may be configurable, based on, for example, the amount of power the system uses, and/or the capacitance of BBU 110; the embodiments described herein may therefore support timers of lengths of other than one minute, either shorter or longer. In accordance with embodiments described herein, a base line for selecting a timer length may be that the SOC should not change more than 1% between two SOC status check intervals.

Similar logic may be employed for the main power loss interrupt. If the main power is lost, BBU 110 may be turned on, independent of whether BBU 110 had been turned on or off at a previous point. The assumption may be that BBU 110 has at least enough power to power the device's operation from the time that main power is lost until at least the next time the BBU SOC is checked in the next interrupt, e.g., for at least one minute as per the example provided hereinabove. For example, if the BBU SOC is close to, or even under 6%, it may be checked and turned off during the next run of the interrupt service subroutine.

Figure 2:
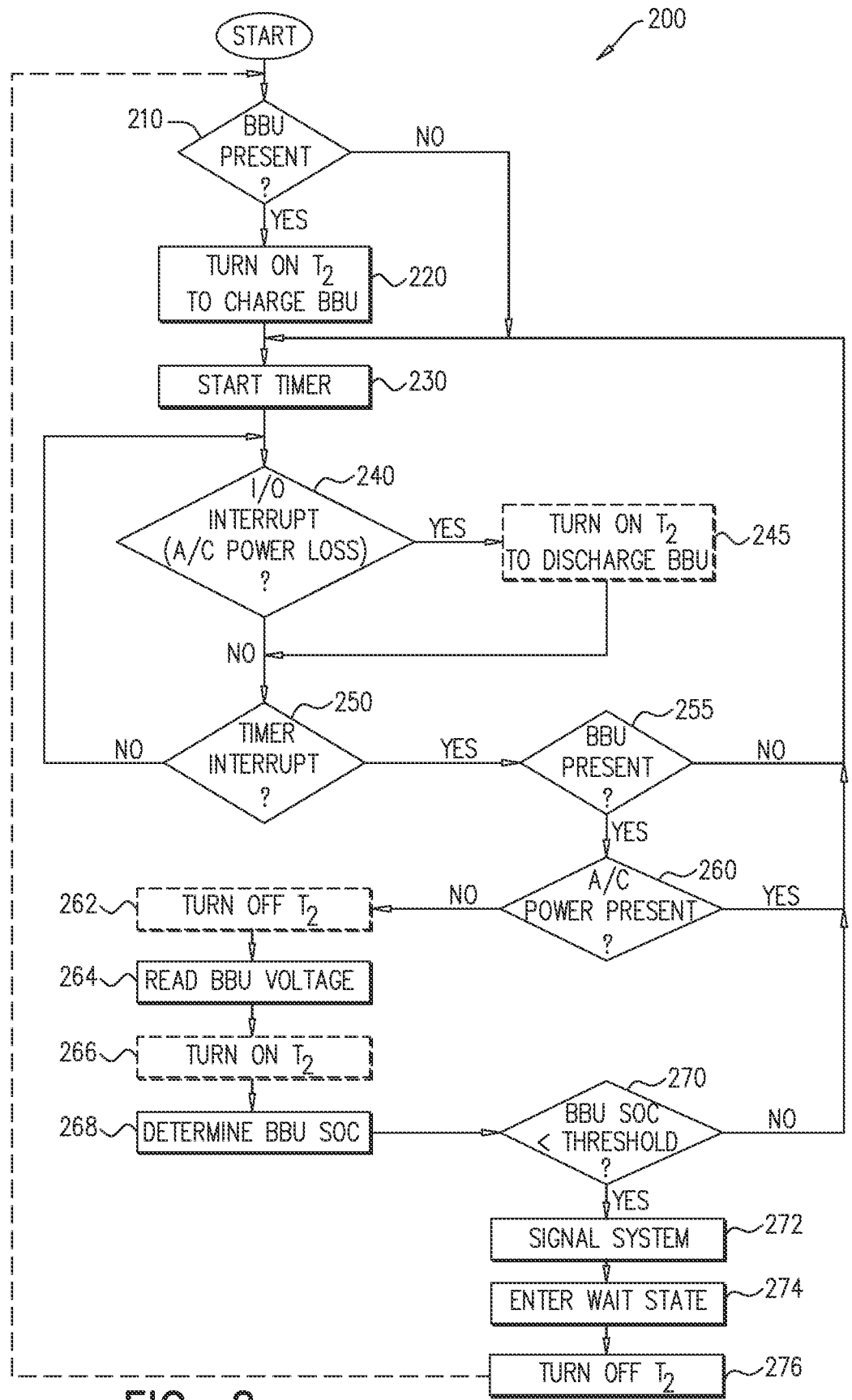
FIG. 2 is a flowchart of an exemplary BBU charging and discharging control process to be performed by a BBU cut-off microcontroller of the circuit in FIG. 1.

Reference is now also made to FIG. 2 which is a flowchart of an exemplary BBU charging and discharging control process 200 to be performed by BBU cut-off microcontroller 120 in accordance with embodiments described herein. It will be appreciated that the steps of process 200 may be described with respect to the elements of circuit 100 as described with respect to FIG. 1.

If BBU 110 is present in circuit 100 (step 210), microcontroller 120 may turn on (step 220) $T_2$ 140 as discussed hereinabove, thereby effectively turning on $T_1$ 130. It will be appreciated that BBU 110 may receive power entering through connection 150 through a body diode in $T_1$ 130, even if $T_1$ 130 is not yet turned on. However, by turning on $T_1$ 130, microcontroller 120 may enable BBU 110 to charge with low series resistance. In accordance with some embodiments described herein, at some point, e.g., when BBU 110 is fully charged or at least approaching a fully charged state, microcontroller 120 may turn off $T_2$ 140 to effectively turn off $T_1$ 130. At that point, BBU 110 may continue to "top off" its charge through the $T_1$ 130 body diode.

It will be appreciated that the device's application circuits may also receive current flowing through connection 150. It will similarly be appreciated that the device uses power from the main power source to continue processing while process 200 continues to step 230 from either step 210 or 220.

Microcontroller 120 may start (step 230) a timer for the interrupt service subroutine as described hereinabove, e.g., for one minute. It will be appreciated that it is possible that at this point $T_1$ 130 may be turned off. For example, if BBU 110 was not present in step 210, step 220 may not have been performed. Similarly, as described hereinabove, in some implementations, $T_1$ 130 may be turned off after BBU 110 is fully charged. Accordingly, if $T_1$ 130 is turned off and microcontroller 120 detects an I/O interrupt indicating an A/C power loss from the main power source (step 240), microcontroller 120 may turn on $T_2$ 140 to effectively turn on (step 245) $T_1$ 130, thereby enabling current to discharge from BBU 110 across connection 150 to the device's application circuits, as well as microcontroller 120. Otherwise, if $T_1$ 130 is already on at the time of an A/C power loss from the main power source, BBU 110 may begin discharging through $T_1$ 130 without active intervention by microcontroller 120.

If there is a timer interrupt (step 250), i.e., the timer times out, microcontroller 120 may check to see if BBU 110 is present in circuit 100 in a similar manner as step 210. If BBU 110 is not present in circuit 100, process control may return to step 230 where another timer may be set for the next execution of the interrupt service subroutine. Otherwise, microcontroller 120 may check if there is A/C power present (step 260), i.e., if main power is flowing through connection 150. It will be appreciated that microcontroller 120 may use methods known in the art to perform step 260, for example, but not limited to, methods disclosed in U.S. patent application Ser. No. 15/261,860, entitled "ACTIVE AC POWER LOSS DETECTION" and filed on Sep. 9, 2016, which is incorporated herein by reference. If A/C power is present, there may be no need to use BBU 110 to power the device, and process control may return to step 230 where another timer may be set for the next execution of the interrupt service subroutine.

If there is no A/C power present, microcontroller 120 may read (step 264) the voltage from BBU 110. Microcontroller 120 may then determine (268) the SOC for BBU 110 based on the voltage read in step 264. It will be appreciated that in some embodiments, the accuracy of step 264 may be improved by microcontroller 120 first turning off (step 262) $T_2$ 140 to effectively turn off $T_1$ 130 prior to reading the voltage from BBU 110. In such embodiments, microcontroller 120 may then turn on (step 266) $T_2$ 140 to effectively turn $T_1$ 130 back on. It will be appreciated that microcontroller 120 may receive power from $C_1$ 180 during this brief period in which $T_1$ 130 is turned off. It will also be appreciated that the application circuits may also be powered in a similar fashion during this period.

If the SOC for BBU 110 is less than a pre-defined threshold (step 270), e.g., 6% as per the above example, microcontroller 120 may signal (step 272) the device's system to shut down in anticipation of locking down BBU 110. It will be appreciated that the pre-defined threshold to be used in step 270 may be determined, at least in part, as a function of battery type. For example, BBU 110 may be configured with different types of batteries with different battery chemistries. For example, the battery (or batteries) in BBU 110 may be lithium ion or lithium polymer, each of which may have different properties to be considered when determining an associated pre-defined threshold for shutting down BBU 110.

Microcontroller 120 may then enter (step 274) a wait state to give the system time to shut down, e.g., ten milliseconds. Microcontroller 120 may then turn off (step 276) $T_2$ 140 to effectively turn off $T_1$ 130. It will be appreciated that shortly after $T_1$ 130 has been turned off, microcontroller 120 will run out of power and cease to operate. Process 200 may therefore be effectively suspended until main power is restored and process 200 is restarted from step 210.

It will also be appreciated that the order of steps 266 and 268 may be exemplary; in some implementations step 268 may be performed prior to step 266. In other implementations, the performance of step 266 may be contingent on the results of step 270, e.g., it may be performed only if the SOC is greater than the pre-defined threshold.

It will also be appreciated that the embodiments described herein may support the insertion of BBU 110 as a plug-in module after the initial execution of process 200. If BBU 110 is not present the first time steps 210 and/or 255 are run, $T_2$ 140 may not be turned on. But if BBU 110 is plugged in after the system starts running, $T_2$ 140 may be turned on in a subsequent iteration of step 255, thereby turning on $T_1$ 130 and enabling BBU 110 to being charged when main power is present and discharged when main power is lost.

In accordance with some embodiments described herein, some or all of BBU cut-off microcontroller 120, first transistor ($T_1$) 130, second transistor ($T_2$) 140, first resistor ($R_1$) 160, second resistor ($R_2$) 170, and/or capacitor ($C_1$) 180 may be provided in a separate, pluggable module that may be inserted into the device between connection 150 and BBU 110, thereby facilitating a more flexible backup battery configuration depending, for example, on the likelihood of extended power outages and/or the accessibility of the device for battery replacement and maintenance. This embodiment may also facilitate the retrofitting of the protection capabilities described herein to existing systems that did not include them in their factory configuration.

It will be appreciated that the embodiments described herein may provide remedy for situations where battery backup is required but replacing the battery is either very difficult or very costly or both, such that longer battery life and/or longer replacement interval may be critical to the functioning of the device. For example, circuit 100 may be implemented in an IoT device in a remote/difficult to reach location such as a mountain-top, or in an arctic weather station. Circuit 100 may serve to preserve BBU 110 in a lockdown state even when AC or DC main power is absent for several months, or even a year, while enabling the associated device/system to shut down in a controlled manner.

It will be appreciated that the specific configuration of circuit 100 as presented in FIG. 1 may be exemplary. The design principles described herein with respect to the embodiments of FIGS. 1 and 2 may also be applied to other implementations of a BBU cut-off and recharge circuit. For example, in accordance with some embodiments described herein, $T_1$ 130 may be replaced with a mechanical relay switch with self-latch capability. The mechanical relay switch may cut off the battery discharge path even more cleanly than $T_1$ 130, effectively extending the viability of the battery during a long lockdown state (as compared to using a MOSFET transistor) by reducing total leakage from BBU 110 to just battery cell self-discharge. However, there may be trade-offs to consider when using a mechanical relay. For example, a mechanical relay may be larger and/or may be more costly to implement than a MOSFET transistor such as $T_1$ 130. Accordingly, the use of a mechanical relay instead of $T_1$ 130 may be a function of the relative importance of safety, reliability, size and/or cost of a given device. In accordance with some embodiments, both a mechanical relay and a MOSFET transistor may be implemented in series, where use of the mechanical relay is limited to locking down BBU 110 when the SOC is too low to continue powering the device from BBU 110.

It will also be appreciated that the rate of BBU leakage in circuit 100 may be lower by one or two magnitudes than in non-MOSFET (and/or mechanical relay) cut-off implementations. Circuit 100 may reduce the leakage current from a tens of micro-amp level down to a nano amp range. It follows therefore, that by reducing the leakage from BBU 110 during low battery conditions, circuit 100 may effectively extend a standard interval for replacement of BBUs 110 in devices deployed in in the field, thereby serving to reduce the overall use of resources to operate the associated systems. It will, however, also be appreciated that the embodiments described herein may also support the use of n-channel MOSFET transistors instead of, or in addition to, p-channel MOSFET transistors. Similarly, the embodiments described herein may also support the use of other types of transistors that may be arrayed and manipulated to provide the same functionality as described herein with respect to MOSFET transistors.

In summary, the embodiments described herein may effectively detect an AC or DC main power loss condition and battery pack SOC, thereby enabling an associated device or system to turn on battery backup to compensate for main power loss and to ensure un-interrupted system operations. Upon a battery draining to a low SOC threshold level, the BBU discharge path is completely cut-off to prevent BBU 110 from over draining. Therefore, battery life may be extended and the corresponding BBU replacement cycle can be prolonged.

It is appreciated that software components of the embodiments of the disclosure may, if desired, be implemented in read only memory (ROM) form. The software functions may, generally, be implemented in hardware, if desired, using conventional analog or digital logic techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for battery backup unit (BBU) cut-off and recharging, the method implemented on a microcontroller on an electronic device and comprising:
   detecting a loss of power from a main power source;
   reading voltage associated with a backup battery unit associated with said electronic device;
   determining a status of charge (SOC) for said BBU;
   upon determining that said SOC is below a pre-defined threshold, locking down said BBU; and
   upon determining that said SOC is above said pre-defined threshold, restarting an interrupt timer.

2. The method according to claim 1 and further comprising:
   notifying a system for said electronic device to shut down application circuits.

3. The method according to claim 2 and further comprising:
   waiting for a pre-defined period of time before performing said locking down.

4. The method according to claim 3 and further comprising:
   detecting said power from said main power source.

5. The method according to claim 4 and further comprising:
   turning on charging for said BBU from said main power source.

6. The method according to claim 3 and further comprising:
   starting said interrupt timer for a pre-defined time.

7. The method according to claim 6 and further comprising:
   performing said detecting, reading and determining according to an interrupt from said interrupt timer.

8. The method according to claim 7 and further comprising:
   defining said pre-defined time as a function of at least a type of battery in said BBU.

9. A battery backup unit (BBU) cut-off and recharge circuit comprising:

a power entry connection connected to a main power source; and a microcontroller, wherein said microcontroller is operative to:
  detect a loss of power from said main power source;
  read voltage associated with a backup battery unit associated with an electronic device;
  determine a status of charge (SOC) for said BBU;
  upon determining that said SOC is below a pre-defined threshold, lock down said BBU; and
  upon determining that said SOC is above said pre-defined threshold, restart an interrupt timer.

10. The BBU cut-off and recharge circuit of claim 9, wherein said microcontroller is further configured to:
  notify a system for said electronic device to shut down application circuits.

11. The BBU cut-off and recharge circuit of claim 10, wherein said microcontroller is further configured to:
  wait for a pre-defined period of time before performing said locking down.

12. The BBU cut-off and recharge circuit of claim 11, wherein said microcontroller is further configured to:
  detect said power from said main power source.

13. The BBU cut-off and recharge circuit of claim 12, wherein said microcontroller is further configured to:
  turn on charging for said BBU from said main power source.

14. The BBU cut-off and recharge circuit of claim 11, wherein said microcontroller is further configured to:
  start said interrupt timer for a pre-defined time.

15. The BBU cut-off and recharge circuit of claim 14, wherein said microcontroller is further configured to:
  detect, read and determine according to an interrupt from said interrupt timer.

16. The BBU cut-off and recharge circuit of claim 15, wherein said microcontroller is further configured to:
  define said pre-defined time as a function of at least a type of battery in said BBU.

17. A non-transitory tangible computer-interpretable medium encoded with instructions that, when executed by a microprocessor of a battery backup unit (BBU) cut-off and recharge circuit, cause the microprocessor to: detect a loss of power from a main power source; read voltage associated with a backup battery unit associated with an electronic device; determine a status of charge (SOC) for said BBU; upon determining that said SOC is below a pre-defined threshold, lock down said BBU; and upon determining that said SOC is above said pre-defined threshold, restart an interrupt timer.

18. The non-transitory tangible computer-interpretable medium of claim 17, wherein the instructions further cause the microprocessor to: notify a system for said electronic device to shut down application circuits; and wait for a pre-defined period of time before performing said locking down.

19. The non-transitory tangible computer-interpretable medium of claim 18, wherein the instructions further cause the microprocessor to: detect said power from said main power source; and turn on charging for said BBU from said main power source.

20. The non-transitory tangible computer-interpretable medium of claim 18, wherein the instructions further cause the microprocessor to: start said interrupt timer for a pre-defined time; and detect, read and determine according to an interrupt from said interrupt timer.

* * * * *